United States Patent [19]
Nomoto et al.

[11] Patent Number: 5,289,563
[45] Date of Patent: Feb. 22, 1994

[54] FUZZY BACKWARD REASONING DEVICE

[75] Inventors: Kohei Nomoto; Tetsuo Kirimoto; Yoshimasa Ohhashi, all of Kanagawa, Japan

[73] Assignee: Mitsubishi Denki Kabushiki Kaisha, Tokyo, Japan

[21] Appl. No.: 704,262

[22] Filed: May 22, 1991

Related U.S. Application Data

[63] Continuation-in-part of Ser. No. 490,761, Mar. 8, 1990.

[30] Foreign Application Priority Data

May 24, 1990 [JP] Japan ................... 2-134966

[51] Int. Cl.⁵ .......................................... G06F 15/20
[52] U.S. Cl. ................................. 395/51; 364/516; 382/14; 395/900; 395/902
[58] Field of Search .............. 395/61, 51, 900, 902, 395/50; 364/516; 382/14, 15

[56] References Cited

U.S. PATENT DOCUMENTS

| | | | |
|---|---|---|---|
| 4,484,193 | 11/1984 | Bellew | 342/98 |
| 4,707,697 | 11/1987 | Coulter et al. | 342/90 |
| 4,754,410 | 6/1988 | Leech et al. | 364/513 |
| 4,837,725 | 6/1989 | Yamakawa | 364/807 |
| 4,847,795 | 7/1989 | Baker et al. | 364/579 |
| 4,866,635 | 9/1989 | Kahn et al. | 364/513 |
| 4,875,184 | 10/1989 | Yamakawa | 364/807 |
| 4,912,648 | 3/1990 | Tyler | 395/61 |
| 4,918,620 | 4/1990 | Ulug | 364/513 |
| 5,036,474 | 7/1991 | Bhanu et al. | 364/516 |
| 5,058,033 | 10/1991 | Bonissone et al. | 395/51 |
| 5,191,638 | 3/1993 | Wakami et al. | 395/51 |

OTHER PUBLICATIONS

Leung et al, "Fuzzy Concepts in Expert Systems", Computer, Sep., 1988, pp. 43-56.
Zadeh, "Fuzzy Logic", Computer, Apr. 1988, pp. 83-93.
Guirong, et al., "An Intelligence Recognition Method of Ship Targets," Proc. IEEE National Aerospace and Electronics Conf., May 1989, 1088-1096.
Roth, M. W., "Survey of Neural Network Technology for Automatic Target Recognition," IEEE Trans. on Neural Networks, Mar. 1990, 28-43.
Whalen & Schott, Goal-Directed . . . Production System, 1985, pp. 505-517, Approx. Reasoning in Expert Systems.
Bogler, Shafer-Dempster Reasoning . . . Systems, 1987, pp. 968-977, IEEE Trans. On Systems, vol. SMC-17, No. 6, Nov./Dec. 1987.
Popoli & Blackman, Expert System Allocation . . . Antenna Radar, 1987, pp. 1821-1826, Proced. of Amer. Control Conf. vol. 1987, No. 3.
Hayashi & Nakai, Efficient Method . . . Fault Diagnosis, 1988, 6 pages, Int'l Workshop on Art. Intell. for Ind. Appl., 1988.

Primary Examiner—Allen R. Macdonald
Assistant Examiner—Robert W. Downs
Attorney, Agent, or Firm—Wolf, Greenfield & Sacks

[57] ABSTRACT

A sequential type Fuzzy backward reasoning device is disclosed, which is capable of performing computation progressively every time a feature quantity is observed to update reasoning, and of performing the reasoning even if the order of observations is arbitrary, by providing means for performing the sequential reasoning instead of batch type reasoning means, and feedback means for feeding back a reasoned result.

Additionally, a target recognition device is disclosed, which is capable of computing the reliability of a recognized result on a target and outputting the same as a numerical value, by obtaining another recognition information even if there is not obtained any information concerning the target, using said sequential type Fuzzy backward reasoning device.

5 Claims, 12 Drawing Sheets

═══ INTERVAL FUZZY QUANTITY
─── ORDINARY FUZZY QUANTITY

= INTERVAL FUZZY QUANTITY

CAUSE         CAUSALITY         FEATURE-
              RELATION          QUANTITY
( ? )         ( KNOWLEDGE)      (OBSERVABLE)

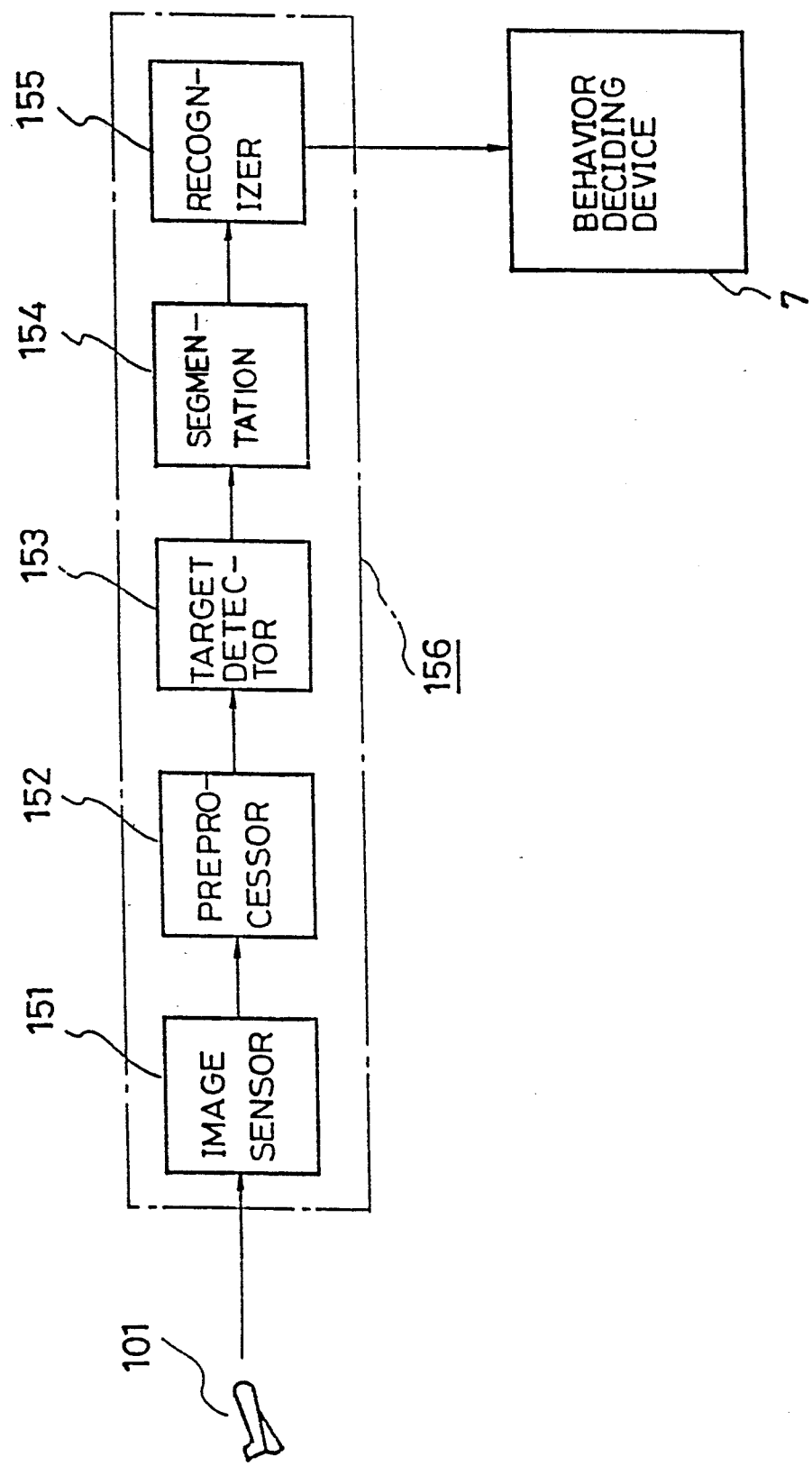

FUZZY BACKWARD REASONING DEVICE

CROSS REFERENCE TO RELATED APPLICATION

This application is a continuation-in-part of application Ser. No. 07/490,761 filed Mar. 8, 1990.

BACKGROUND OF THE INVENTION

1. Field of the Invention

The invention relates to a Fuzzy backward reasoning device useful for application fields requiring reasoning of a cause of a feature quantity such as for example target classification in air traffic control, diagnoses in medical services and fault diagnoses in plants, etc.

2. Description of the Prior Art

Referring to FIG. 10, a prior art Fuzzy backward reasoning device is illustrated in a block diagram. The device is disclosed for example in "Method of Solution to Fuzzy Inverse Problem" Tsukamoto and Tashiro, Papers in the 3rd System Symposium supported by the Society of Instrument and Control Engineers, Vol. 15, No. 1, p.p. 21 to 25, 1979. As shown in the same figure, designated at 51 is batch reasoning means for receiving all of feature quantities [$b_j$] and causality relations [$r_j$] for Fuzzy backward reasoning and outputting reasoned results [$\hat{a}_i$], 3 is causality relation storage means for outputting the causality relations [$r_j$] previously stored in the batch reasoning means, 5 is a Fuzzy backward reasoning device composed of the batch reasoning means 51 and the causality relation storage means.

The foregoing feature quantities [$b_j$], causality relations [$r_j$], and reasoned results [$\hat{a}_i$] are Fuzzy vectors, respectively, and the feature quantities [$b_j$] express observed failure phenomena and the reasoned results [$\hat{a}_i$] express reasoned failure causes and the like.

Referring to FIG. 11, there is illustrated the principle of the Fuzzy backward reasoning. In the figure, designated at 52 are causality relations corresponding to [$r_j$] described above. The logically true causality relation 52 has m limitable true causes $a_1, a_2 \ldots, a_m$, and induces n observable feature quantities $b_1, b_2, \ldots, b_n$. $a_i$, $b_j$ take values from 0 to 1 and indicate the degree of occurrence of those feature quantities. These quantities are expressed by row vectors $$\hat{a} = [a_1, a_2 \ldots a_m] \quad (1)$$

$$b = [b_1, b_2 \ldots b_n] \quad (2).$$

The causality relation 52 as a rule is represented by a m x n matrix $R = [r_{ij}]$ with elements $r_{ij}$ taking a value of from 0 to 1, each element indicating a degree where the feature quantity $b_j$ is caused by the cause $a_i$. If vectors of each column are designated by $r_j$, then they denote a causality relation that causes the feature quantities $b_j$. Herein, the matrix $R$ is expressed by $$R = (r^1 r^2 \ldots r^n) = \begin{bmatrix} r_{11} & r_{12} & \cdots & r_{1n} \\ r_{21} & & & \\ \vdots & & & \\ r_{m1} & & \cdots & r_{mn} \end{bmatrix} \quad (3)$$

The relationship among $\hat{a}$, $b$, and $R$, illustrated in FIG. 11 satisfies $$\hat{a} \circ R = b \quad (4).$$

Herein, the symbol ∘ indicates max-min composition. That is, for each element $$b_j = \bigvee_{i=1}^{n} (a_i \wedge r_{ij}). \quad (5)$$

Herein, $\vee$ denotes max operation and $\wedge$ min operation. The causality relation $R$ is given as a knowledge and the feature quantity $b$ is observable. Hereby, the cause $\hat{a}$ that causes such a feature quantity $b$ can be reasoned. The reasoning is given by the Fuzzy backward reasoning. A result of the reasoning gives $$\hat{a} = [\hat{a}_1, \hat{a}_2 \ldots \hat{a}_m] \quad (6).$$

More specifically, the Fuzzy backward reasoning device 5 receives the feature quantities $b$ of from $b_1$ to $b_n$ from the outside, and reads out the causality relation 52 of from $r^1$ to $r^n$ through the causality relation storage means 3. It further estimates the reasoned values $\hat{a}_1$ to $\hat{a}_m$ corresponding to the causes $a_1$ to $a_m$, using the batch reasoning means 51, and outputs those reasoned values.

Referring now to FIG. 12, a flow chart indicative of operation of calculating the reasoned values $\hat{a}_i$ by the prior art Fuzzy backward reasoning device 5 is illustrated. The operation will be described exemplarily. It is assumed that the causality relation $R$ from the causality relation memory means 3 and the observed feature quantities $b$ are inputted into the batch reasoning means 51 from the outside, as follows for example.

$$R = \begin{bmatrix} 0.4 & 0.0 & 0.9 \\ 0.7 & 0.8 & 0.3 \\ 0.6 & 0.3 & 0.3 \end{bmatrix} \quad (7)$$

$$b = (0.4 \ 0.0 \ 0.9) \quad (8)$$

First in step T1, the number p of the solutions (the reasoned values $\hat{a}_i$) is initialized. Then, in step T2, a matrix $U$ is calculated according to the following equation.

$$u_{ij} = r_{ij} \omega b_j = \begin{cases} b_j & r_{ij} > b_j \\ (b_j, 1.0) & r_{ij} = b_j \\ \phi & r_{ij} < b_j \end{cases} \quad (9)$$

Herein, [$b_j$, 1.0] indicates a closed interval from $b_j$ to 1.0 and $\phi$ means a null set or no solution. Likewise, in step T3 a matrix $U$ is calculated according to the following relation.

$$\tilde{u}_{ij} = r_{ij} \tilde{\omega} b_j = \begin{cases} (0, b_j) & r_{ij} > b_j \\ (0, 1.0) & r_{ij} \leq b_j \end{cases} \quad (10)$$

In the example expressed by the equations (7), (8), $U$, $\tilde{U}$ are given as follows.

$$\mathbb{U} = \begin{bmatrix} (0.4, 1.0) & (0.0, 1.0) & (0.9, 1.0) \\ 0.4 & 0.0 & \phi \\ 0.4 & 0.0 & \phi \end{bmatrix} \quad (11)$$

$$\mathbb{U} = \begin{bmatrix} (0.0, 1.0) & (0.0, 1.0) & (0.0, 1.0) \\ (0.0, 0.4) & 0.0 & (0.0, 1.0) \\ (0.0, 0.4) & 0.0 & (0.0, 1.0) \end{bmatrix} \quad (12)$$

In step T4, the number L of combinations of non-$\phi$ elements of respective columns of $\mathbb{U}$ is calculated. With $\mathbb{U}$ expressed by (11), $$L = 3 \times 3 \times 1 = 9 \quad (13).$$

In step T5, if L is zero, then there is no solution, and the operation advances to step T12 to output "no solution". If L is not zero, then L solutions must be taken into consideration. In step T6, one element of each column of $\mathbb{U}$ which is not $\phi$ is taken out, and remaining elements are taken out from $\mathbb{U}$, to form a matrix $\mathbb{W}^k$. In the present example, $\mathbb{W}$ includes 9 combinations, one of which is as follows, for example.

$$\mathbb{W}^1 = \begin{bmatrix} (0.4, 1.0) & (0.0, 1.0) & (0.9, 1.0) \\ (0.0, 0.4) & 0.0 & (0.0, 1.0) \\ (0.0, 0.4) & 0.0 & (0.0, 1.0) \end{bmatrix} \quad (14)$$

In step T7, a product set of the ith row of $\mathbb{W}^k$ is taken out to yield the ith element of $\hat{a}$. $\mathbb{W}$ of the expression (14) gives $$\hat{a} = [(0.9, 1.0) 0.0 \ 0.0] \quad (15).$$

In step T8, if there is any $\phi$ element among those elements of $\hat{a}$, i.e., if there is not yielded any product set in any row of $\mathbb{W}^k$, then $\hat{a}$ in this case is not taken as a reasoned result. In step T9, the number of reasoned results is counted. In step T10, a resulting reasoned result, e.g., $\hat{a}$ of the expression (15) is outputted. Finally, after L combinations of $\mathbb{W}$ are estimated, in step T11 if P=0, i.e., if no reasoned result is yielded finally, then the operation jumps to step T12 in which it decides and outputs "no solution".

The prior art Fuzzy backward reasoning device arranged as described above however has a difficulty that the reasoning can be initiated only after all feature quantities $b_1$ to $b_n$ have been observed. It further has another difficulty that a processor with a higher computational capability is required because the associated computation must be done at a spot.

Alternatively, there is known a prior art target recognition device disclosed as a typical in, for example, Bir Bhanu: Automatic Target Recognition: State of the Art Survey, IEEE Transactions on Aerospace and Electronics, Vol. AES-22, No. 4, p.p. 364–379 (1986), as illustrated in FIG. 13. As illustrated in the figure, designated at 101 is a target to be recognized, 151 is an image sensor for observing the target 101 and outputting image information, 152 is a preprocessor for receiving the image information from the image sensor 151, 153 is a target detector for receiving an output from the preprocessor, 154 is a segmentation for receiving an output from the target detector 153, 155 is a recognizer for receiving an output from the segmentation 154, 156 is a prior typical target recognition device composed of the image sensor 151, preprocessor 152, target detector 153, segmentation 154, and recognizer 155, and 7 is a behavior deciding device for receiving an output from the target recognition device 156.

The target recognition device 156 shown in FIG. 13 is to recognize the target 101 as an image, and is operable as follows. First, the image sensor 151 observes the target 101 as an image. For the image sensor 151, there are sometimes available an infrared sensor and a millimeter wave radar. The preprocessor 152 is to receive and previously process an image, the output from the image sensor 151, and output a processed result. This preprocessing includes suppression of involved noise and clutter and emphasis of the contour of an image, for example. The target detector 153 is to receive the image data processed previously as such, and detect from that data a region where there is existent one which might be considered to be a target, and output it. The segmentation 154 performs image processing highly accurately for the detected region, and extracts and outputs a target from the background extremely accurately. The recognizer 155 collates the target image so extracted with images stored in a data base and outputs the name of the kind of a so-coincident target. This is an output from the prior typical target recognition device 156. The output is fed to the behavior deciding device 7 as a guide to decide a behavior to the target.

Such prior art target recognition devices recognize a target based upon a single kind of information (image information, for example, if an image sensor is used.) available from a sensor with use of a Neuman type computer as described above. Those devices however suffer from a difficulty that there can not be obtained any information concerning a target provided no image information is outputted from the image sensor 151 because such a target is located at a long distance and hence is difficult to be observed as having any shape or because a target is existent in clouds and/or in smoke. Furthermore, those devices have another difficulty that it is unclear to what degree information for recognition of a target from the sensor is reliable.

SUMMARY OF THE INVENTION

To solve the problems with the prior art, it is an object of the present invention to provide a Fuzzy backward reasoning method in which feature quantities at arbitrary observations are sequentially inputted to sequentially effect Fuzzy backward reasoning feeding back reasoned results.

Another object of the present invention is to provide a Fuzzy backward reasoning device capable of reasoning even if features are observed in an arbitrary order by computing the reasoning in a small quantity at a time each time one feature is observed, and updating the reasoned result.

Still another object of the present invention is to provide a Fuzzy backward reasoning device capable of achieving a desired purpose by acquiring other pieces of recognition information even when a sensor can not detect certain target information because a target is located at a long distance.

Still further another object of the present invention is to provide a target recognition device capable of evaluating as numerical values the degree of reliability of a recognized result on the a basis of resulting target information.

To achieve the above objects, a Fuzzy backward reasoning device according to the present invention is to receive observed feature quantities as a given fact from the outside sequentially, read out a set causality relation between causes and feature quantities, a previously given knowledge, from the inside sequentially, and subjecting said causality relation so read out to Fuzzy backward reasoning and outputting reasoned causes as a new conclusion sequentially, and is characterized in comprising causality relation storage means for storing a plurality of causality relations in which a plurality of feature quantities can be caused by a plurality of causes, reasoned result feedback means for feeding back a present sequential reasoned cause as a previous sequential reasoned cause after unit time, and sequential reasoning means for receiving a sequential observation feature quantity from the outside at arbitrary observation time, reading out a sequential set causality relation corresponding to the sequential observation feature quantity from the causality relation storage means, and feeding back the previous sequential reasoned cause from the reasoned result feedback means, for sequential Fuzzy backward reasoning, and further outputting a present sequential reasoned cause decided from sequential observation feature quantities received until now.

A Fuzzy backward reasoning device according to the present invention is comprised of causality relation storage means for previously storing each causality relation in which a plurality of feature quantities are caused by a plurality of causes and of reasoning means for inputting each feature quantity inputted from the outside and each causality relation stored in said causality relation storage means, reasoning a cause which causes said feature quantity using Fuzzy backward reasoning and outputting a reasoned result, and is characterized in further including sequential reasoning means as the reasoning means for effecting Fuzzy backward reasoning based upon a feature quantity inputted at this time, a causality relation read from the causality relation storage means corresponding to said feature quantity, and a previous reasoned result, and reasoned result feedback means for feeding back a reasoned result from the sequential reasoning means to an input of the sequential reasoning means.

Furthermore, a target recognition device according to the present invention includes a sensor for observing a target to obtain target information, a plurality of feature extractors each for receiving the target information outputted from said sensor and extracting a feature quantity of the target, and a Fuzzy backward reasoning device for receiving the information having said feature quantity outputted from each feature quantity extractor and effecting Fuzzy backward reasoning, based upon the kinds of targets and recognition information concerning those targets, all having previously been possessed thereby as target candidates, according to the Fuzzy backward reasoning.

The above and other objects, features, and advantages of the invention will become more apparent from the following description when taken in conjunction with the accompanying drawings.

BRIEF DESCRIPTION OF THE DRAWINGS

FIG. 13 is a block diagram illustrating the prior art target recognition device.

DESCRIPTION OF THE PREFERRED EMBODIMENTS

Figure 1:
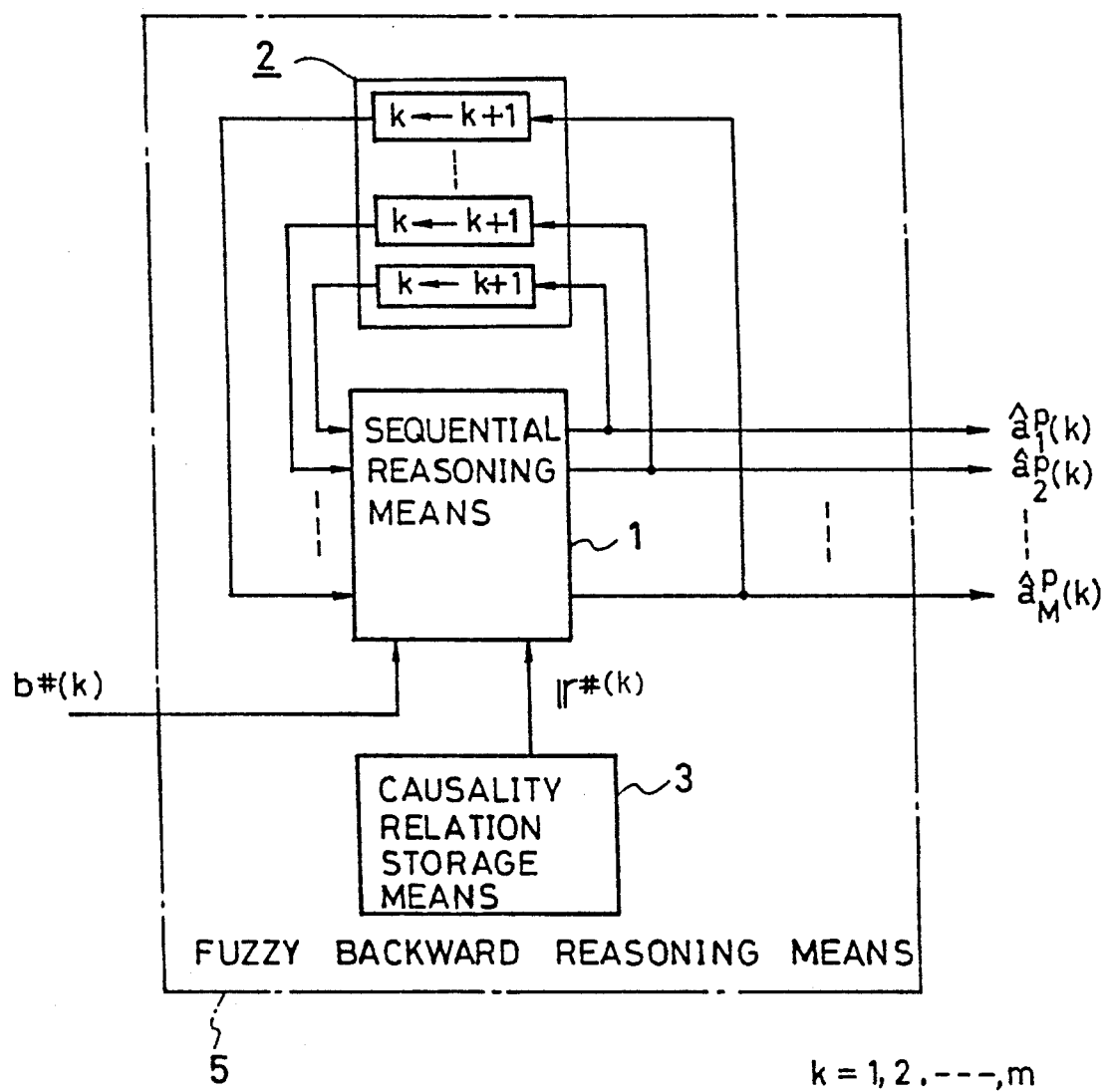
FIG. 1 is a block diagram illustrating a Fuzzy backward reasoning device according to an embodiment of the present invention.

Referring to FIG. 1, a functional block diagram is given of a Fuzzy backward reasoning device of an embodiment of the present invention. In FIG. 1, designated at (1) is sequential reasoning means, $b_\#(k)$, is a Fuzzy vector expressing a sequentially observed feature quantity inputted sequentially from the outside upon arbitrary observation of an observable feature quantity, $\mathbb{r}\#(k)$ is a Fuzzy vector expressing a sequentially set causality relation yielded by sequentially reading a causality relation which can be previously set as a knowledge from causality relation storage means corresponding to the Fuzzy vector $b_\#(k)$. Designated at (2) is reasoned result feedback means for feeding back a reasoned result " $\hat{a} P(k)$", an output from the sequential reasoning means as a next input to the sequential reasoning means. The causality relation storage means 3 stores the Fuzzy vector $\mathbb{r} \#(k)$ expressing the causality relation between causes and result (feature quantities) as the knowledge previously given. Designated at $\hat{a}P(k)$ is Fuzzy vector expressing a sequential reasoned cause of a reasoned result outputted from the sequential reasoning means 1.

Reference number 5 designates a Fuzzy backward reasoning device consisting of said sequential reasoning means 1, reasoned result feedback means 2, and causality relation storage means 3 according to the present invention. Said sequential reasoning means 1 is a processor of computer system and can be realized by performing the program based on the flowchart shown in FIG. 2. The reasoned result feedback means 2 can be realized by its register and the causality relation storage means 3 can be realized by its memory.

(In the above description, the following relations hold: $\mathbb{r}_i\#^{(k)}=[r_{i\#(k)}]^T$, $\hat{a} P(k)=[\hat{a} P(k)]^T$, $p=1, 2, \ldots, p^*(k)$.)

Figure 2:
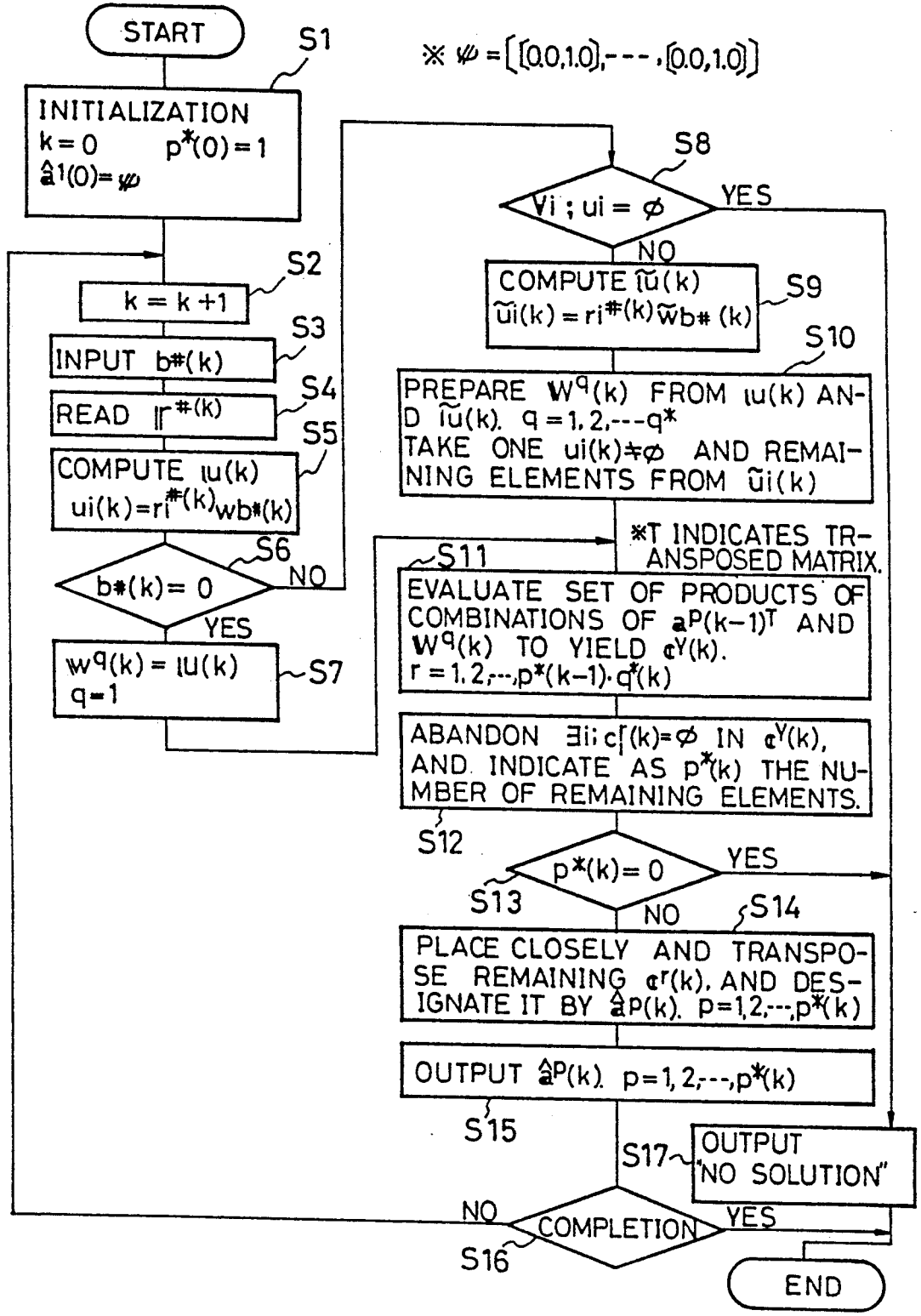
FIG. 2 is a flow chart illustrating the Fuzzy backward reasoning device of FIG. 1.

In the Fuzzy backward reasoning device (5), there are inputted into the sequential reasoning means (1) the Fuzzy vector $b_\#(k)$ of the sequentially observed feature quantity inputted from the outside, the Fuzzy vector â #(k) of the sequentially set causality relation inputted from the causality relation storage means (3), and the Fuzzy vector âP(k) of the previous sequentially reasoned cause inputted from the reasoned result feedback means to effect the Fuzzy backward reasoning with a sequential processing algorithm as illustrated in FIG. 2 and output the Fuzzy vector âP(k+1) of the present sequential reasoning cause.

As illustrated in FIG. 2, in the sequential processing algorithm of the Fuzzy backward reasoning, the number of times k of observations of an feature quantities, the number of sets p*(k) of the k-th reasoning causes, and reasoning causes â¹(k) are all initialized, and with the number of times k of observations incremented by 1, a k-th observation feature quantity $b_{\#(k)}$ and a corresponding set causality relation $r^{\#(k)}$ are together inputted to evaluate each element $u_i(k)$ of the column vector â(k) by ω composition based on the following equation;

$$u_i(k) = r_i^{\#(k)} \omega b_{\#(k)},$$

in steps S1 through S5.

Then, if $b_{\#}(k)=0$, then $W^1(k) = U(k)$ is assumed, and the operation jumps to step S11. If $b_{\#}(k) \neq 0$, then the operation jumps to step S17 provided $U_i(k) = \phi$ for all elements of $U(k)$ and outputs "no solution". Alternatively, with $U_i(k) \neq \phi$ for any element of $U(k)$, each element $\hat{u}_i(k)$ of the column vector is evaluated by $\overline{\omega}$ composition based on the following equation:

$$\overline{u}_i(k) = r_i^{\#(k)} \overline{\omega} b_{\#(k)},$$

In steps S6 through S9.

Further, each element $w_i q(k)$ of a column vector $W^q(k)$ (q=1, 2, . . . , q*(k)) is evaluated by taking out only one of the elements $u_i(k) \neq \phi$ of u(k) and taking out remaining elements from the corresponding elements $\hat{u}_i(k)$ of $\overline{u}(k)$ in step S10.

Furthermore, each element $c_i^r(k)$ of a column vector $C^r(k)$ (r=1, 2, . . . , r*(k)) is evaluated by taking a product set of respective elements $w^q(k)$ of $W_i q(k)$ and respective elements $â_i P(k-1)$ of a row vector $\hat{e}P(k-1)^T$ of the previous reasoning cause with respect to all combinations of set numbers $r^*(k) = q^*(k) \times p^*(k-1)$, in step S11.

$C^r(k)$ with elements $c_i^r(k) = \phi$ are abandoned, and the numbers of remaining column vector are assumed to be $p^*(k)$. If $p^*(k)=0$, then the operation jumps to step S17 and outputs "no solution", while if $p^*(k) \neq 0$, then a remaining column vector $C^r(k)$ is put close, renumbered, transposed, and named a row vector â P(k), in steps S12 through S14.

Finally, this is outputted as a k-th reasoning cause $\tilde{a}P(k)$ thereof in step S15.

Herein, provided all reasoning is not completed, the same processing is repeated from step S2, in step S16.

There are assumed for example three feature quantities $b_1$, $b_2$ and $b_3$, and corresponding causality relations $r^1$, $r^2$ and $r^3$. $b_j$ is to be observed from now on while $j$ have previously been stored in the causality relation storage means 3. $r^j$ are as follows, for example.

$$r^1 = \begin{bmatrix} 0.4 \\ 0.7 \\ 0.6 \end{bmatrix}, r^2 = \begin{bmatrix} 0.0 \\ 0.8 \\ 0.3 \end{bmatrix}, r^3 = \begin{bmatrix} 0.9 \\ 0.3 \\ 0.3 \end{bmatrix}. \quad (16)$$

Referring again to the flow chart, in step S1, a count k, the number p*(k) of k-th reasoned results, and a reasoned result â¹(k) are initialized. Then, in step S2, the count is incremented by 1. In step S3, a feature quantity $b_{\#(k)}$ observed at the k-th time is inputted into the sequential reasoning means 1. In step S4, a corresponding causality relation is read out from the causality relation storage means 3. For example, a feature quantity observed at the time of k=1 concerns $b_1$ which is now assumed to be 0.4. Herein, $b_{\#(k)}$ and $r^{\#(k)}$ at #(k) are as follows.

$$b_{\#(1)} = b_1 = 0.4 \quad (17)$$

$$r^{\#(1)} = r^1 = \begin{bmatrix} 0.4 \\ 0.7 \\ 0.6 \end{bmatrix}. \quad (18)$$

In step S5, operation of the expression (9) is executed to evaluate a vector $U(k)$:

$$U(1) = \begin{bmatrix} (0.4, 1.0) \\ 0.4 \\ 0.4 \end{bmatrix}. \quad (19)$$

In step S6, it is decided whether or not $b_{\#(k)}=0$, and if $b_{\#(k)}=0$, then $W^1(k) = U(k)$ is assumed in step S7, and the operation jumps to step S11. If $b_{\#(k)} \neq 0$, then it is judged in step S8 whether or not all elements of $U(k)$ are $\phi$. If all are $\phi$, then the operation jumps to step S17 to output "no solution", or otherwise advances to step S9. In step S9, operation of (10) is executed to calculate the vector $\overline{U}(k)$.

$$\overline{U}(1) = \begin{bmatrix} (0.0, 1.0) \\ (0.0, 0.4) \\ (0.0, 0.4) \end{bmatrix}. \quad (20)$$

In step S10, one of the elements in $U(k)$ which are not $\phi$ is taken out and remaining elements are taken from $\overline{U}(k)$ to form $W^q(k)$. In this example, there are three vectors of such $W^q(k)$:

$$W^1(1) = \begin{bmatrix} (0.4, 1.0) \\ (0.0, 0.4) \\ (0.0, 0.4) \end{bmatrix} \quad (21)$$

$$W^2(1) = \begin{bmatrix} (0.0, 1.0) \\ 0.4 \\ (0.0, 0.4) \end{bmatrix}$$

-continued $$W^3(1) = \begin{bmatrix} (0.0, 1.0) \\ (0.0, 0.4) \\ 0.4 \end{bmatrix}.$$

In step S11, $C^r(k)$ is constructed by evaluating a product set between $W^q(k)$ of the equation (21) and a reasoned result $\hat{a}^p(k-1)^T$ reasoned from feature quantities up to the previous time. Here, T designates transposition.

$$C(1) = \begin{bmatrix} (0.4, 1.0) \\ (0.0, 0.4) \\ (0.0, 0.4) \end{bmatrix} \quad (22)$$

$$C^2(1) = \begin{bmatrix} (0.0, 1.0) \\ 0.4 \\ (0.0, 0.4) \end{bmatrix}$$

$$C^3(1) = \begin{bmatrix} (0.0, 1.0) \\ (0.0, 0.4) \\ 0.4 \end{bmatrix}.$$

In step S12, those with $\phi$ among $C^r(k)$ are abandoned, and the number of remaining vectors are denoted by $p^*(k)$. In step S13, if $p^*(k)=0$, or if all $C^r(k)$ are abandoned, then the operation jumps to step S17 to output "no solution". If $p^*(k)\neq 0$, then the operation advances to step S14, and a remaining $C^r(k)$ is put close transposed, and denoted by $\hat{a}^p(k)$.

$$\begin{cases} \hat{a}^1(1) = [(0.4, 1.0)\,(0.0, 0.4)\,(0.0, 0.4)] \\ \hat{a}^2(1) = [(0.0, 1.0)\,0.4\,(0.0, 0.4)] \\ \hat{a}^3(1) = [(0.0, 1.0)\,(0.0, 0.4)\,0.4] \end{cases} \quad (23)$$

In step S15, $\hat{a}^p(k)$ of the expression (23) is outputted as a k-th time reasoned value. If it is judged in step S16 that overall reasoning has not yet been completed, then the operation again returns to the step S2 to update the algorithm. This is done by the reasoned result feedback means 2. At the time all feature quantities have completely been reasoned, a given reasoned value is reached whatever the order of such reasonings is. More specifically, it is assumed further in the present example that $b_3$ is observed as being 0.9 at k=2 times and finally $b_2$ as 0.0. The features is given as follows in the case of k=2.

$$b_{\#(2)} = b_3 = 0.9 \quad (24)$$

$$\pi_{\#(2)} = \pi^3 = \begin{bmatrix} 0.9 \\ 0.3 \\ 0.3 \end{bmatrix} \quad (25)$$

After the same calculation as in k=1, the following reasoned values are yielded.

$$\begin{cases} \hat{a}^1(2) = [(0.9, 1.0)\,(0.0, 0.4)\,(0.0, 0.4)] \\ \hat{a}^2(2) = [(0.9, 1.0)\,0.4\,(0.0, 0.4)] \\ \hat{a}^3(2) = [(0.9, 1.0)\,(0.0, 0.4)\,0.4] \end{cases} \quad (26)$$

Further, at k=3, the following is reasoned.

$$b_{\#(3)} = b_2 = 0.0 \quad (27)$$

$$\pi_{\#(3)} = \pi^2 = \begin{bmatrix} 0.0 \\ 0.8 \\ 0.3 \end{bmatrix} \quad (28)$$

After the same calculation as in k=1, the following reasoning is finally attained.

$$\hat{a}^1(3) = [(0.9, 1.0)\,0.0\,0.0] \quad (29)$$

Figure 3:
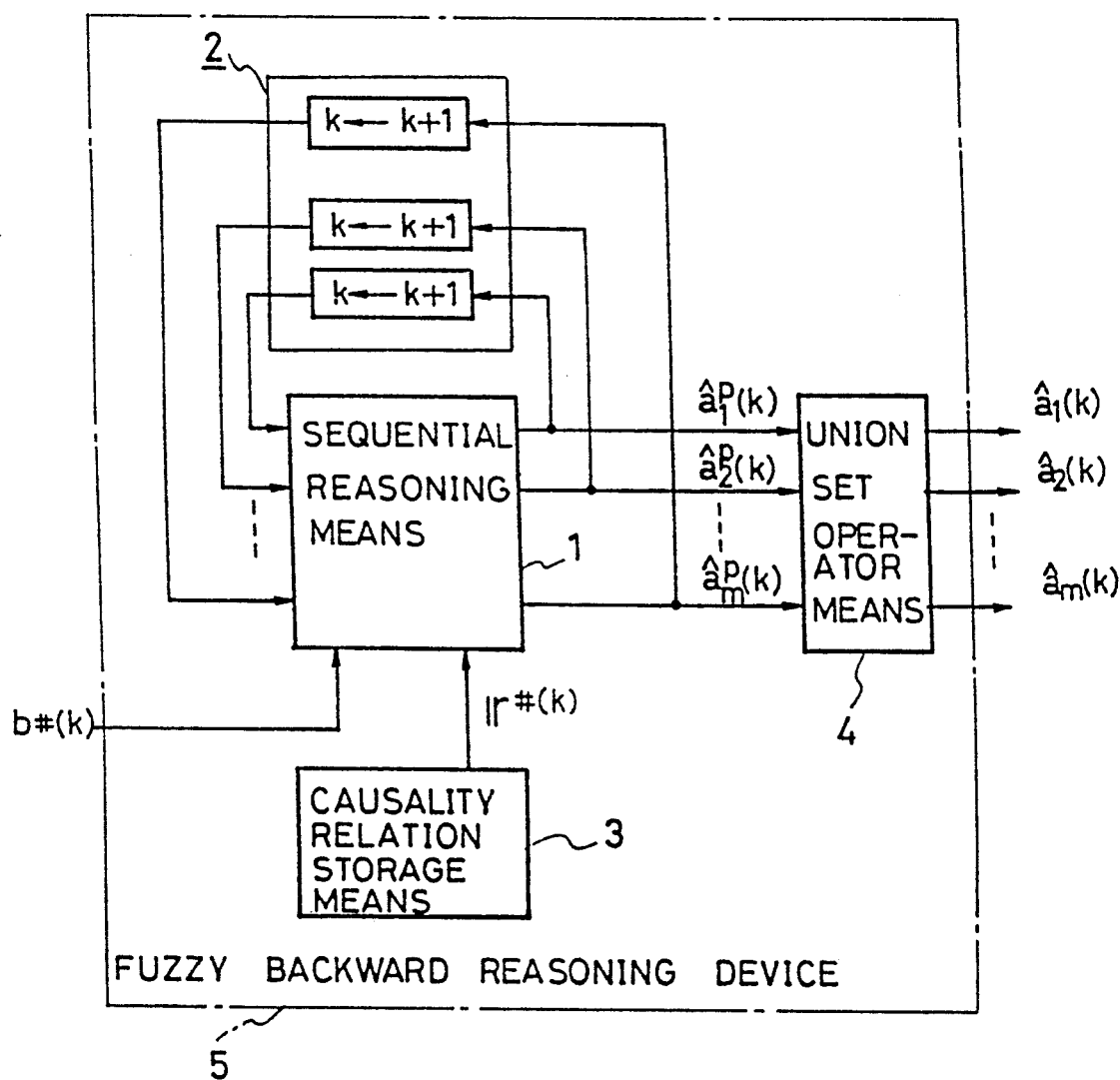
FIG. 3 is a block diagram illustrating a Fuzzy backward reasoning device according to another embodiment of the present invention.

In the above embodiment, $p^*(k)$ of the reasoned results $\hat{a}^p(k)$ are existent. Actually, however, when there are existent a plurality of reasoned results, the processing thereof is complicated. It may therefore sometimes be desirable that they are jointly outputted as one signal. FIG. 3 illustrates another embodiment of the present invention suited to such a situation. In FIG. 3, numeral 4 is union set operation means for evaluating a union set, which effects the following operation with respect to elements $\hat{a}_i^p(k)$ of $\hat{a}^p(k)$.

$$\hat{a}_i(k) = \bigcup_{p=1}^{p^*(k)} a_i^p(k). \quad (30)$$

Here, U means a union operator. It is thus also effective that the $p^*(k)$ reasoned results are put together into $\hat{a}(k)=(\hat{a}_i(k))$ which is then outputted as a reasoned result of the Fuzzy backward reasoning device according to the present invention. This has an effect that when there are existent a plurality of sequential reasoning causes a difficulty of its processing being complicated can be solved.

Figure 4:
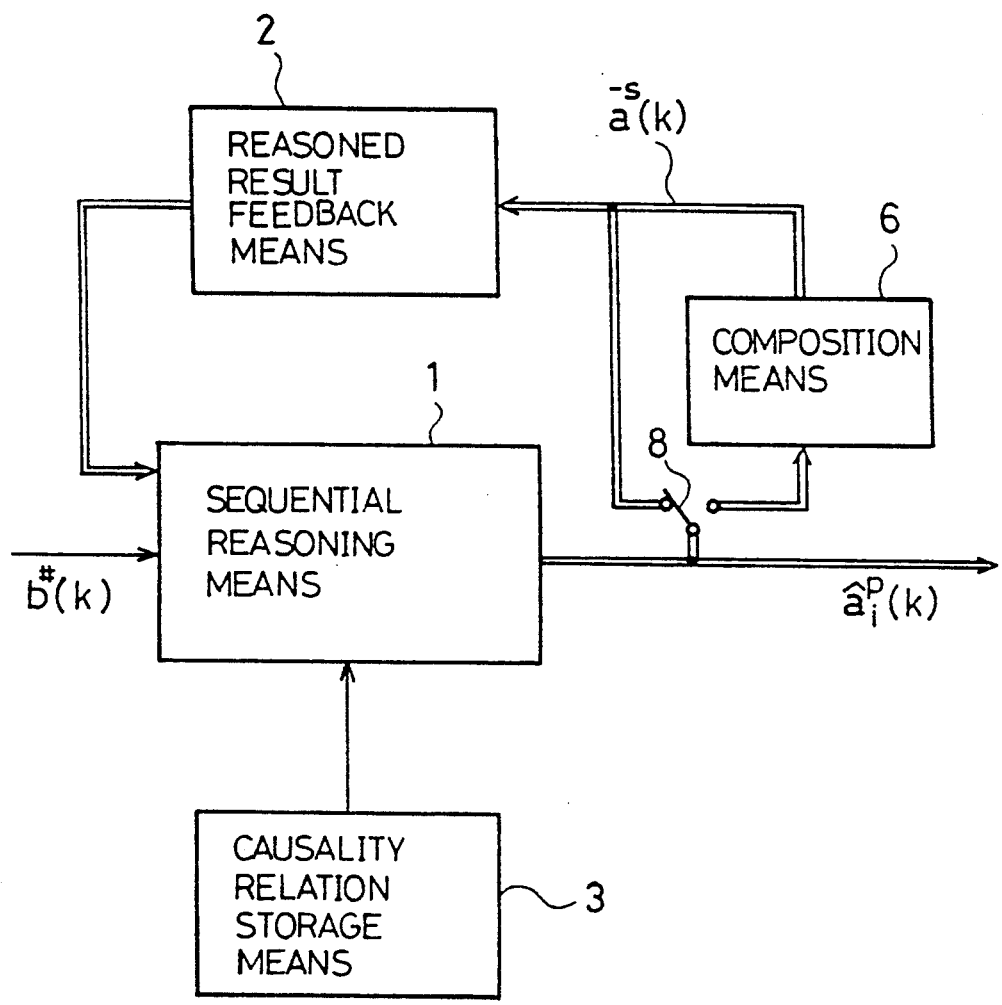
FIG. 4 is a block diagram illustrating another embodiment of the present invention.

Although in the above embodiment the column vector $C^r(k)$ requires necessary operation on combinations of $r^*(k)$ sets, composition means (6) may be provided as follows: As illustrated in FIG. 4, switching means (8) is provided to switch a present sequential reasoned cause $\hat{a}^p(k)$ to be inputted into reasoned result feedback means (2) when the set number $p^*(k)>S$ (a predetermined constant) is satisfied, and the composition means (6) takes a union set among elements $\hat{a}_i^p(k)$ of the sequential reasoned causes $\hat{a}^p(k)$ corresponding to a set $(p^*(k)-S+1)$ to yield S sets of composite reasoned results and hence yield present sequential reasoned results $a^s(k)$ collected to the S sets (herein, S=1, 2, ..., S). This advantageously eliminates a problem that the upper limit of the set number $r^*(k)$ is exponentially increased depending on the observation times k of feature quantities to permit the time desired by an arithmetic processor and the number of desired registers to be increased in proportion to the k-th power of the number m of reasoned causes, and hence restricts the number of vectors $C^r(k)$ which must be calculated every time to m×s sets at most together with reduction of the desired time and the number of desired registers to given values.

Figure 5:
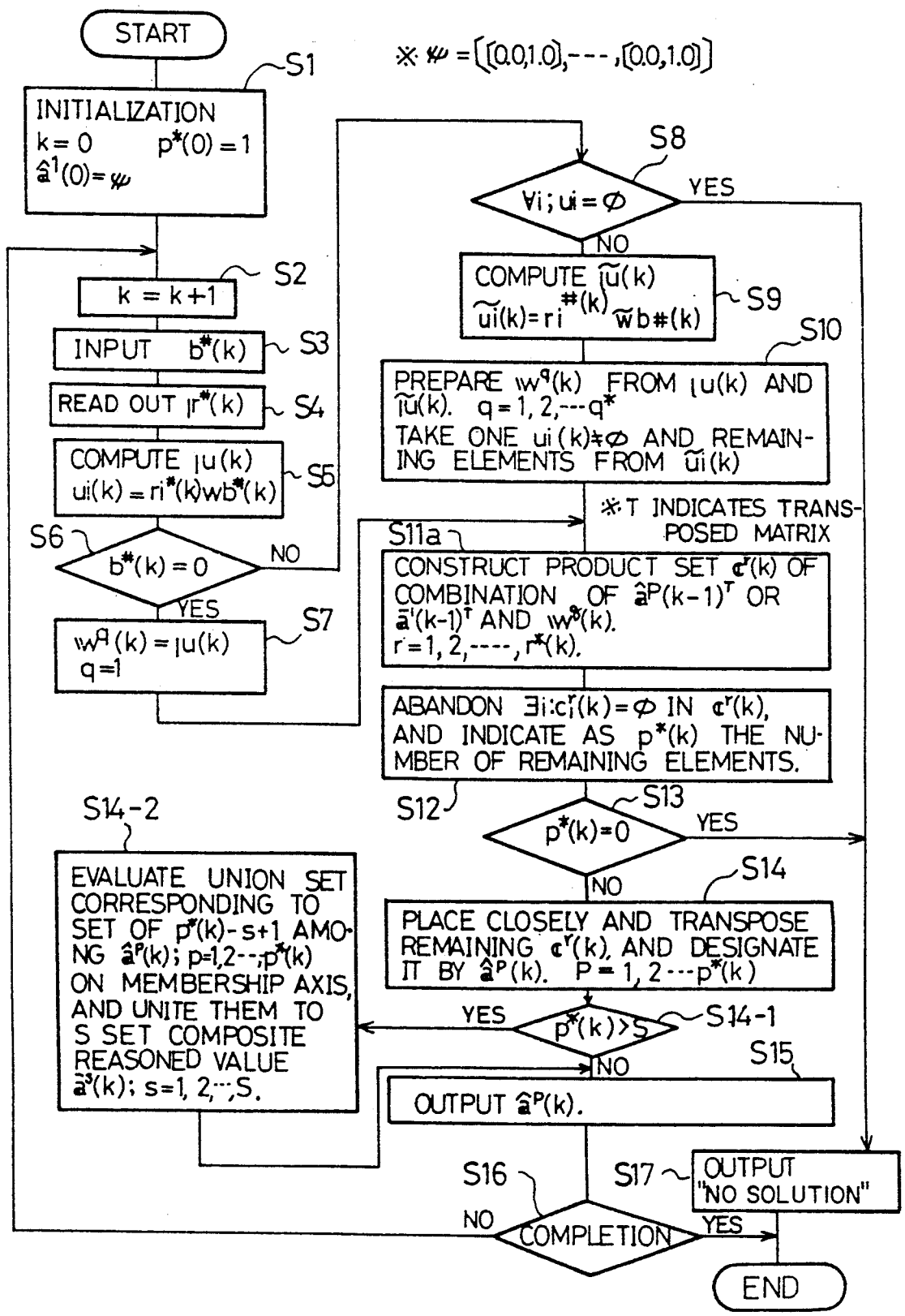
FIG. 5 is a flow chart illustrating the operation of the embodiment of FIG. 4.

In the case where the switching means (8) and the composition means (6) are provided with a processing flow illustrated in FIG. 5, the step S11 of the sequential processing algorithm shown in FIG. 2 is altered such that the elements $c_i^r(k)$ of the column vector $C^r(k)$ are formed as a product set of the elements $w_i^q(k)$ of $W^q(k)$ and the elements $\hat{a}_i^p(k-1)$ or $\bar{a}_i^p(k-1)$ of the previous reasoned cause $\hat{a}^p(k-1)^T$ or composite reasoned cause $\bar{a}^p(k-1)^T$ with respect to all combinations of the set number $r^*(k)=q^*(k)\times p^*(k-1)$ ($p^*(k-1)<(S)$ or $r^*(k)=q^*(k)\times S$, in step S11a, and further a process is added between the step S14 and the step S15, in which process when the set number $p^*(k)$ of the k-th reasoned causes $>S$, a union set is taken among the elements $\hat{a}^p(k)$ of each $\hat{a}^p(k)$ corresponding to the set ($p^*(k)-S+1$) to yield S set composite reasoned causes $\bar{a}^s(k)$, while when $p^*(k)\leq S$, the operation advances to step S15, in steps 14-1 and 14-2.

In the case for example where the sequential observation feature quantities (10) at the times of k=1, 2 and 3; and the corresponding sequential set causality relations (20) are $b_{\#(1)}=0.7=b_2$, $b_{\#(2)}=0.8=b_1$, $b_{\#(3)}=0.2=b_3$; and $\kappa^{\#(1)}=(0.7\ 0.1\ 1.0)^T=\kappa^2$, $\kappa^{\#(2)}=(0.9\ 0.9\ 0.2)^T=\kappa^1$, $\kappa^{\#(3)}=(0.1\ 0.8\ 1.0)^T=\kappa^3$, and where S=3 is selected, the foregoing vectors are as follows:

$\hat{a}^1(1) = ((0.7, 1.0)(0.0, 1.0)(0.0, 0.7))$
$\hat{a}^2(1) = ((0.0, 1.0)(0.0, 1.0)0.7)$
$C^1(2) = (0.8(0.0, 0.8)(0.0, 0.7))^T$
$C^2(2) = ((0.7, 0.8)0.8(0.0, 0.7))^T$
$C^3(2) = (0.8(0.0, 0.8)0.7)^T$
$C^4(2) = ((0.0, 0.8)0.8\ 0.7)^T$
$\hat{a}^1(2) = (0.8(0.0, 0.8)(0.0, 0.7))$
$\hat{a}^2(2) = ((0.7, 0.8)0.8(0.0, 0.7))$
$\hat{a}^3(2) = (0.8(0.0, 0.8)0.7)$
$\hat{a}^4(2) = ((0.0, 0.8)\ 0.8\ 0.7)$ $\bar{a}^1(2) = (0.8\ (0.0, 0.8)(0.0, 0.7))$ ⎫
$\bar{a}^2(2) = ((0.7, 0.8)\ 0.8\ (0.0, 0.7))$ ⎬*
$\bar{a}^3(2) = ((0.0, 0.8)\ (0.0, 0.8)\ 0.7)$ ⎭

$\hat{a}^1(3) = (0.8\ 0.2\ (0.0, 0.2))$
$\hat{a}^2(3) = (0.8\ (0.0, 0.2)\ 0.2)$

*(a case is shown where the last two sets of $^1(2)\sim \hat{a}^4(2)$, i.e., $\hat{a}^3(2)$ and $^4(2)$ are compounded and compressed to a set $S = 3$).

In the above example, the reasoned causes $\hat{a}^1(3)$ and $\hat{a}^2(3)$ are the same as those where the switching means (8) and the composite means (6) are not provided. Although this situation is actually not necessarily the same at all times, distortion of the reasoned cause with respect to the ideal case can be suppressed smaller compared with the case where the vector number to be fed back is limited to one set (S=1).

Although in the above example, the vectors composed by the composite means (6) in the case of the set number $p^*(k)$ of the reasoned cause at k-th time$>S$ were described as being those belonging to a set ($p^*(k)-S+1$) from the last set, the same number of vectors can effectively be selected on the basis of human common sense with physical meaning taken into consideration for example.

Figure 6:
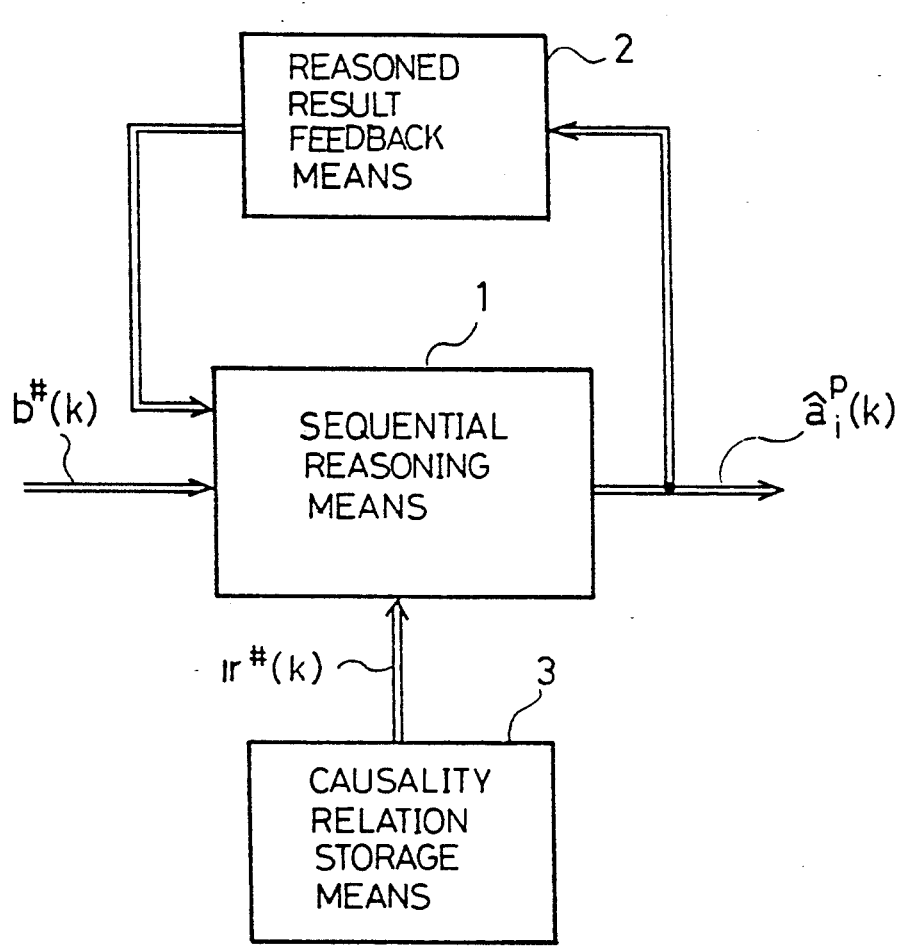
FIG. 6 is a block diagram illustrating yet another embodiment.

Further, although in the embodiments illustrated in FIGS. 1, 3, and 4 the Fuzzy vector $b_{\#(k)}$ of the sequential observation feature quantities and the Fuzzy vector $\kappa^{\#(k)}$ of the sequentially set causality relation were treated as ordinary Fuzzy quantities, one or both of those vectors may be treated as an interval value Fuzzy quantity expressing the degree of ignorance in an interval width, as illustrated in FIG. 6. This eliminates a problem that a false "no solution" might be concluded owing to slight observation error and setting error irrespective of actual existence of a reasoned cause when desired operation is executed for combinations of $r^*(k)$ sets of the column vector $C^r(k)$, and exhibits advantages that the operation is made unlikely to be affected by observation error and setting error and is made durable to deterioration of reasoning.

Figure 7:
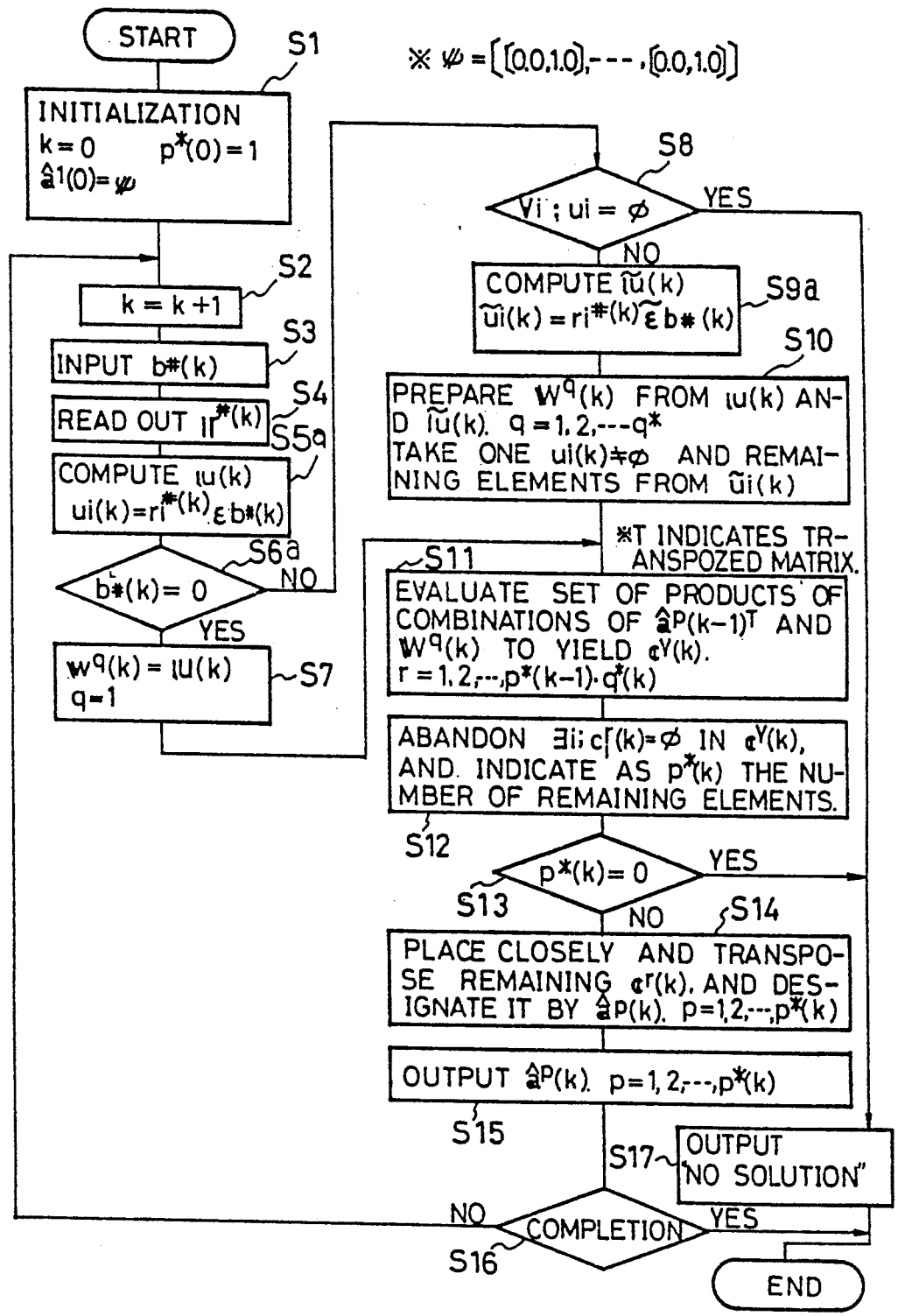
FIG. 7 is a flow chart illustrating the operation of the embodiment of FIG. 6.

In processing the aforementioned Fuzzy vectors as the interval value Fuzzy quantities as illustrated in FIG. 7 wherein the processing flow is provided, there are estimated $\epsilon$ composition instead of the $\omega$ composition in the step S5 of the processing algorithm of FIG. 2 and $\tilde{\epsilon}$ composition instead of the $\tilde{\omega}$ composition in the step S9, in steps S5a and S9a. Further, in step S6 only the lower limit $b_{\#}^L{}_{(k)}$ may be decided, in step S6a.

$$u_{i(k)} = (r_{ij}^L, r_{ij}^U)\epsilon(b_j^L, b_j^U)$$

$$= \begin{cases} (b_j^L, b_j^U) & r_{ij}^L > b_j^U \\ (b_j^L, 1.0)(r_{ij}^L, r_{ij}^U)\cap(b_j^L, b_j^U) \neq \phi \\ \phi & r_{ij}^U > b_j^L \end{cases}$$

$$\tilde{u}_{i(k)} = (r_{ij}^L, r_{ij}^U)\tilde{\epsilon}(b_j^L, b_j^U)$$

$$= \begin{cases} (0.0, b_j^U) & r_{ij}^L > b_j^U \\ (0.0, 1.0) & r_{ij}^L \leq b_j^U \end{cases}$$

(herein, $\epsilon$ and $\tilde{\epsilon}$ represent the $\epsilon$ composition and $\tilde{\epsilon}$ composition.)

For example, in the case where the Fuzzy vector is treated as an ordinary one, with the assumption of $b_{\#(1)}=0.7=b_2$, $\kappa^{\#(1)}=(1.0\ 0.8)^T=\kappa^2$, and $b_{\#(2)}=0.8=b_1$, $\kappa^{\#(2)}=(0.2\ 0.9)^T=\kappa^1$ in the reasonings at the times of k=1, 2, there is no reasoned cause at the time of k=2 as below, but there might be a fear that although there is existent any solution, "no solution" is erroneously presented owing to slight error involved in observed quantities for example:

$\upsilon(1) = (0.7\ 0.7)^T$
$\tilde{\upsilon}(1) = ((0.0, 0.7)\ (0.0, 0.7))^T$
$W^1(1) = (0.7\ (0.0, 0.7))^T$
$W^2(1) = ((0.0, 0.7)\ 0.7)^T$
$C^1(1) = (0.7\ (0.0, 0.7))^T$
$C^2(1) = ((0.0, 0.7)\ 0.7)^T$
$\hat{a}^1(1) = (0.7\ (0.0, 0.7))^T$
$\hat{a}^2(1) = ((0.0, 0.7)\ 0.7)^T$
$\upsilon(2) = (\phi\ 0.8)^T$
$\tilde{\upsilon}(2) = ((0.0, 1.0)\ (0.0, 0.8))^T$
$W^1(2) = ((0.0, 1.0)\ 0.8)^T$
$C^1(2) = (0.7\ \phi)^T$
$C^2(2) = ((0.0, 0.7)\ \phi)^T$ Alternatively, in the case where the above example is treated as the interval value Fuzzy quantities, with the assumption of $b_{\#(1)}=(0.65, 0.75)=b_2$, $\kappa^{\#(1)}=((0.9, 1.0)\ (0.8, 0.9))^T=\kappa^2$, and $b_{\#(2)}=(0.75, 0.85)=b_1, \#^{(2)}=((0.2, 0.3)\ (0.9, 1.0))^T=\kappa^1$ in the reasonings at the times of k=1,2, there is any reasoned cause at the time of k=2 as below, and existence of the solution is deemed that there is also existent any slight error in observed quantities.

$\upsilon^1(1) = ((0.65, 0.75)(0.65, 0.75))^T$
$\tilde{\upsilon}(1) = ((0.00, 0.75)\ (0.00, 0.75))^T$ -continued $$\mathbf{a}^1(1) = ((0.65, 0.75)\ (0.00, 0.75))$$
$$\mathbf{a}^2(1) = ((0.00, 0.75)\ (0.65, 0.75))$$
$$\mathbf{w}^1(2) = ((0.00, 1.00)\ (0.75, 0.85))^T$$
$$\mathbf{a}^1(2) = ((0.65, 0.75)\ 0.75)$$
$$\mathbf{a}^2(2) = ((0.00, 0.75)\ 0.75)$$

In accordance with the present invention as described above, the sequential reasoning means for sequential reasoning instead of the batch reasoning means is provided together with the feedback means for feeding a reasoned-result. Accordingly, the reasoning can be updated every time feature quantities are yielded at an arbitrary order without waiting until all feature quantities have been observed. Additionally, also for the reasoning computation, vector computation can be carried out progressively instead of batch computation of a matrix without requiring a processor with high computation capability.

Herein, it is also effective in the Fuzzy backward reasoning device of the present invention described above to construct the target recognition device by additionally providing a sensor for observing a target as the cause, a feature quantity extractor for extracting a feature quantity of the target based upon an output from the feature quantity extractor and extracting an activated feature quantity from the received output.

In the following, a target recognition device as a concrete exemplary application of the present invention will be described with reference to the accompanying drawings.

Figure 8:
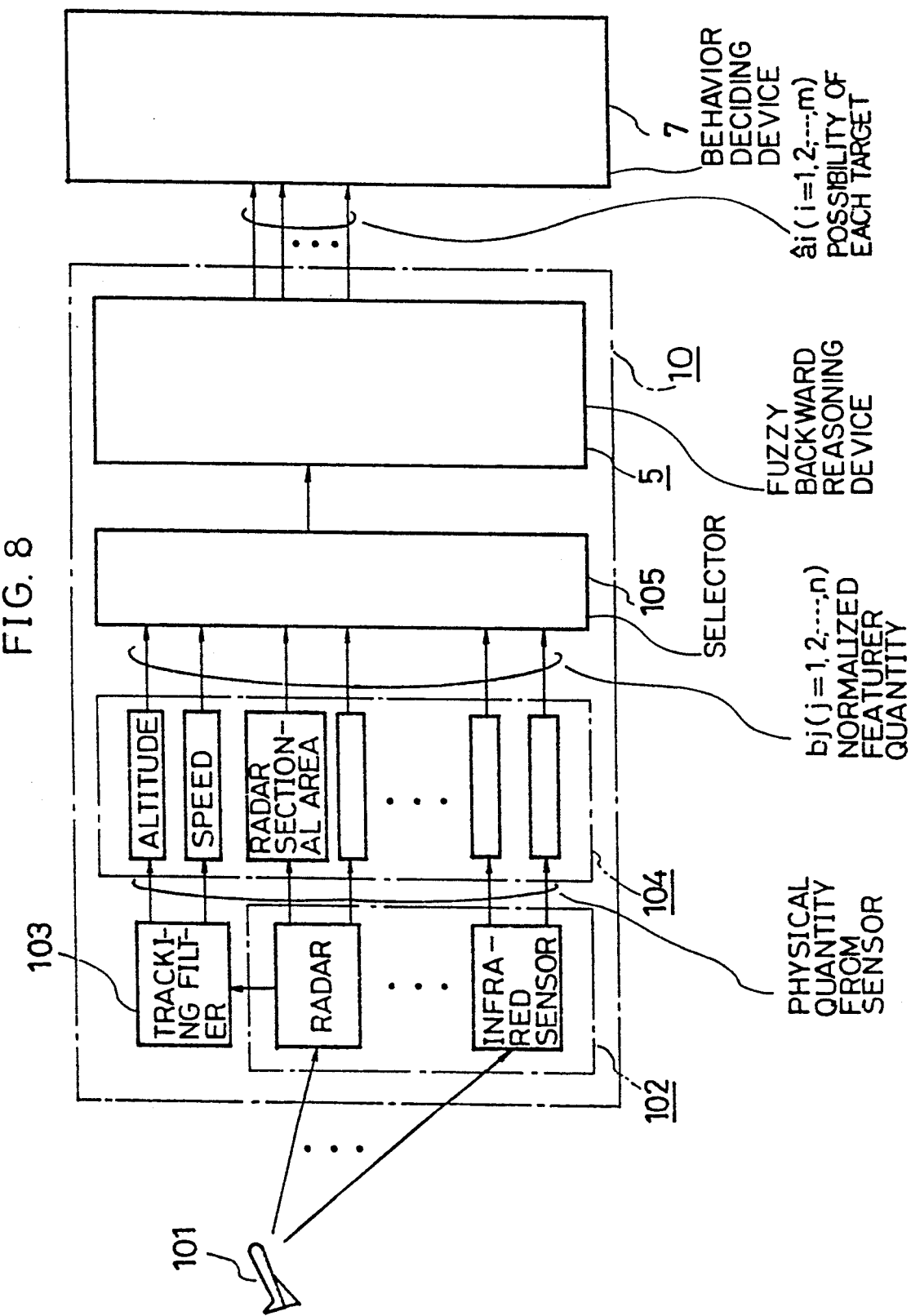
FIG. 8 is a block diagram illustrating a target recognition device as a concrete example of application of the present invention.

In FIG. 8, designated at 101 is a target to be recognized, 102 are a plurality of sensors for observing the target 101, 103 is a tracking filter for receiving observed values of a target position from the sensors 102 to estimate the accurate position, speed, and acceleration and output an estimated result, 104 are a plurality of feature quantity extractors for receiving the outputs from the sensors 102 or the output from the tracking filter 103 to extract and output a feature quantity, 105 is a selector for receiving an output from the feature quantity extractor 104 to extract an activated feature quantity from the output, 5 is a Fuzzy backward reasoning device for receiving an output from the selector 105 to reason the kind of the target 101 according to the Fuzzy backward reasoning, 10 is a target recognition device according to the present invention, the device comprising the sensor 102, tracking filter 103, feature quantity extractor 104, selector 105, and Fuzzy backward reasoning device 5, and 7 is a behavior deciding device for receiving an output from the target recognition device 60.

Operation of the target recognition device constructed as described above is as follows, First, although there are available a radar and an infrared sensor for the sensor 102, only a radar is here used for brevity to observe the target 101. An output from the sensor is of a physical quantity.

The tracking filter 103 receives an observed position of the target 101 as an output from the radar 102 to reason the accurate position and speed of the target and output a reasoned result. The tracking filter 103, although not an independent sensor, provides information concerning the target 101 as in the other sensor 102.

The plurality of the feature quantity extractors 104 serve to reason any information useful for target recognition based upon an output from the sensor 102 or the tracking filter 103. An output from the feature quantity extractor 104 is a feature quantity normalized to a value from zero to one. Although in FIG. 4 each feature quantity extractor 104 is shown to obtain a separate sensor output, there may in general be a situation where a plurality of the feature quantity extractors 104 receive the same sensor output and output different feature quantities. Three feature quantity extractors 104 are assumed here; one for receiving an output from the radar 102, and computing and outputting a radar sectional area of the target 101, second for receiving an output from the tracking filter 103, and detecting and outputting the invasion altitude of an invading target, last one for receiving the output from the tracking filter 103, and computing and outputting the speed of the target 101. The selector 105 for reasoning an activated feature quantity serves to transmit to the Fuzzy backward reasoning device 5 one feature quantity among a plurality of those feature quantities as the output from the feature quantity extractor 104, the one feature quantity being actually obtained at a certain time point.

The Fuzzy backward reasoning device 5 receives the three feature quantities; radar sectional area, invasion altitude, and speed, all being outputs from the three feature quantity extractors 104, respectively. For the kinds of the targets 101 there are imagined three candidates of giant-sized passenger planes, fighters, and cruising missiles. Accordingly, the Fuzzy backward reasoning device 5 computes and outputs a probable distribution on those three target candidates by solving an inverse problem. The output is indicative of a possibility normalized to a value from 0 to 1.

Figure 9:
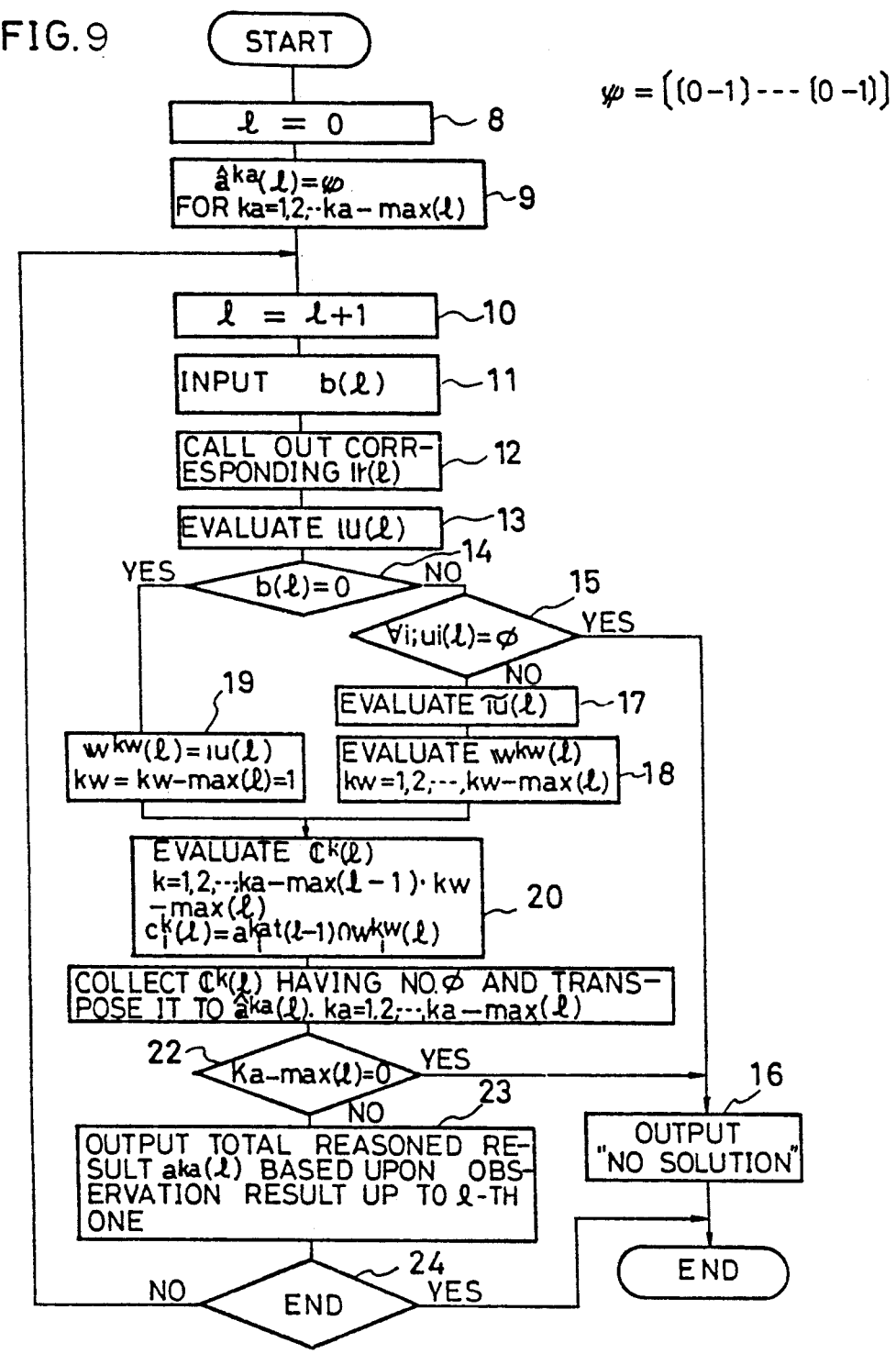
FIG. 9 is a flow chart illustrating the operation of a sequential Fuzzy backward reasoning device in the target recognition device.
Figure 10:
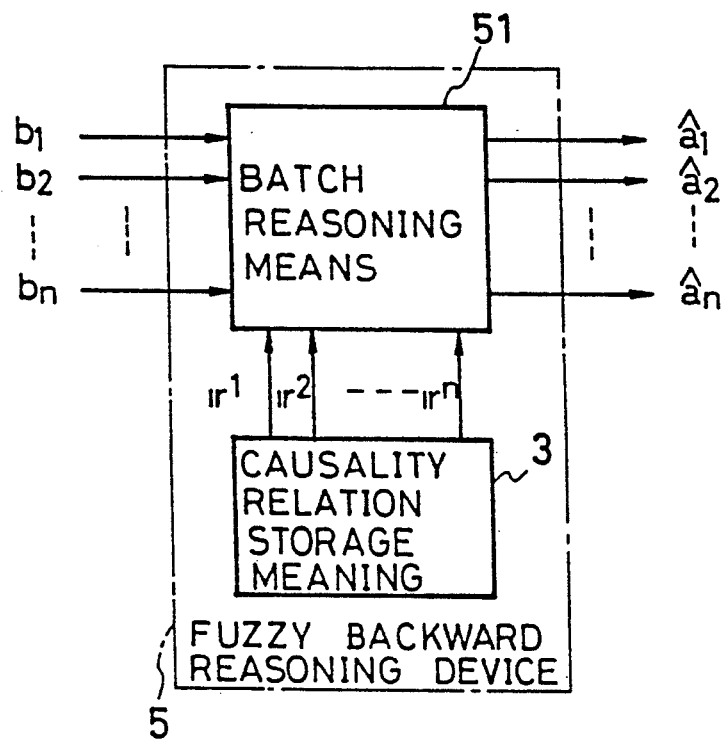
FIG. 10 is a block diagram illustrating a prior art Fuzzy backward reasoning device.
Figure 11:
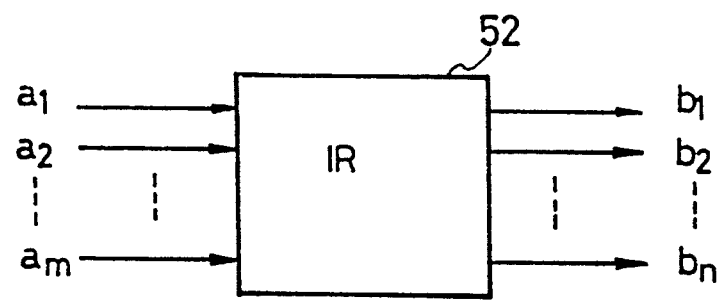
FIG. 11 is a block diagram illustrating the principle of Fuzzy backward reasoning.
Figure 12:
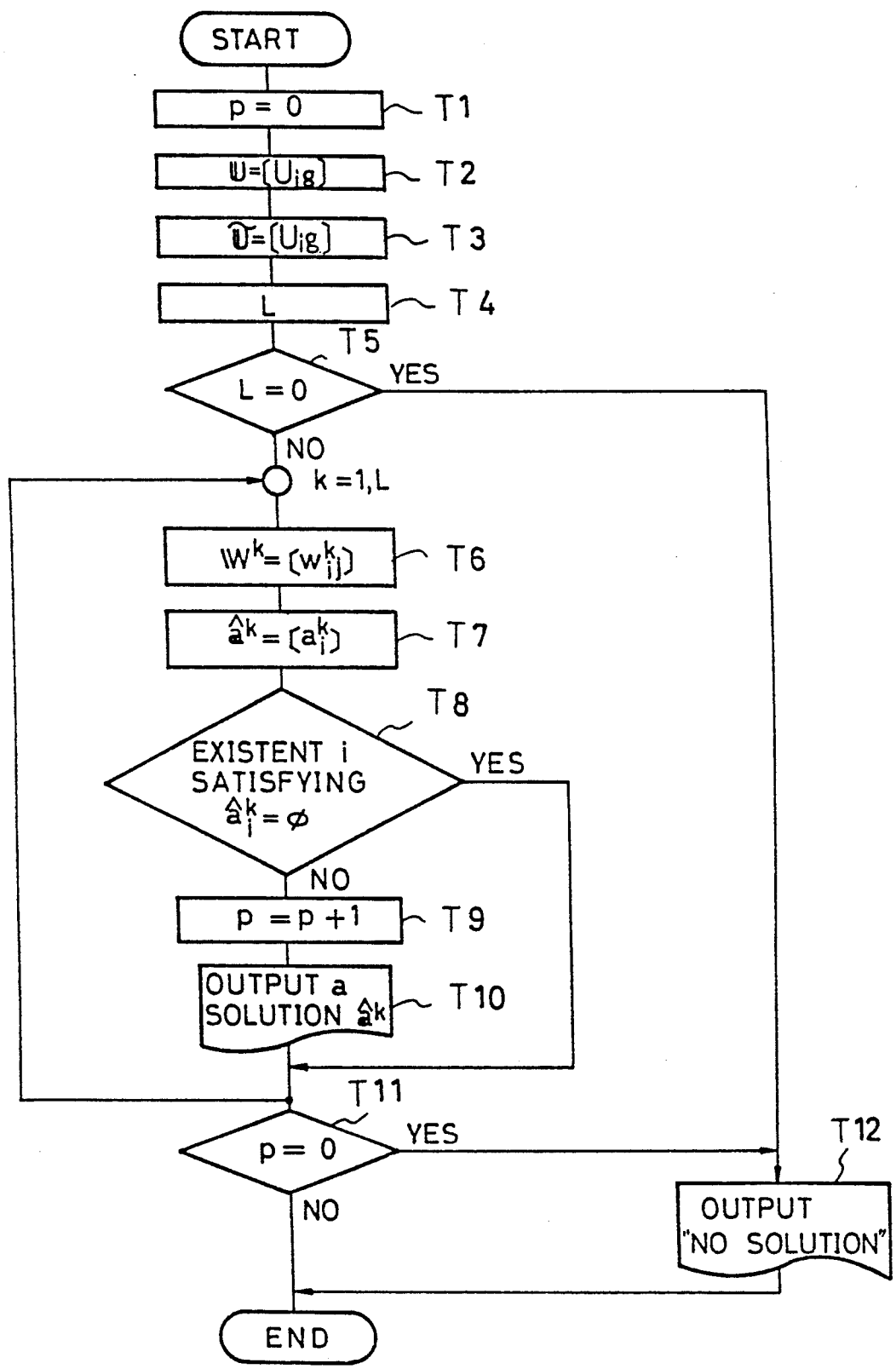
FIG. 12 is a flow chart illustrating the operation of the prior art Fuzzy backward reasoning device.

Herein, operation of the Fuzzy backward reasoning device 5 will be described following a flow chart shown in FIG. 9.

It is first imagined in the case of a giant-sized passenger plane that it does not invade at a low altitude and not fly at a very high speed, and further that a radar cross section is greater. These are now expressed quantitatively as follows: the degree of the low altitude invasion is 0.0; the degree of the high speed 0.3; and the degree of the greater radar cross section 1.0. It is likewise assumed in the case of a fighter that the foregoing degrees are 0.5, 1.0, and 0.5, respectively. In the case of a cruising missile, those degrees are assumed to be 1.0, 0.3, and 0.2, respectively. The above relation is expressed as follows:

$$(a_1 a_2 a_3) \circ \begin{bmatrix} 0.0 & 0.3 & 1.0 \\ 0.5 & 1.0 & 0.5 \\ 1.0 & 0.3 & 0.2 \end{bmatrix} = (b_1 b_2 b_3) \quad (31)$$

Herein, a symbol $\circ$ denotes max-min composition, and $b_1$ for example is computed as follows:

$$b_1 = \max(\min(a_1, 0.0), \min(a_2, 0.5), \min(a_3, 1.0)) \quad (32)$$

Additionally, $a_1$, $a_2$, $a_3$ show respective possibilities of a giant-sized passenger plane, of a fighter, and of a cruising missile. Likewise, $b_1$, $b_2$, $b_3$ show the respective degrees of low altitude invasion, of a high speed, and of a greater radar cross section. Both take numerical values each ranging from 0 to 1.

The Fuzzy backward reasoning device 5 possesses the determinant (31) as a knowledge and receives ($b_1$, $b_2$, $b_3$) on the right side as an output from the feature quantity extractor 104 to reason ($a_1$, $a_2$, $a_3$) on the left side. This is called the Fuzzy backward reasoning. It should here be noticed that ($b_1$, $b_2$, $b_3$) is defined uniquely if $(a_1, a_2, a_3)$ is given whereas $(a_1, a_2, a_3)$ is not defined uniquely even though $(b_1, b_2, b_3)$ is given. No solution might sometimes be existent in the latter case. This means that the possibilities of targets with which the same feature quantity pattern might be caused are not necessarily limited to a single distribution.

For the Fuzzy backward reasoning, the following two operations $\omega, \tilde{\omega}$ will be introduced:

$$p\omega q = \begin{cases} q & (p > q) \\ (q, 1) & (p = q) \\ \phi & (p < q) \end{cases} \quad (33)$$

$$p\tilde{\omega}q = \begin{cases} (0, q) & (p > q) \\ (0, 1) & (p \geq q) \end{cases} \quad (34)$$

Herein, (p, q) denotes a closed interval from p to q, and $\phi$ no solution.

For achieving on-line target recognition, it is needed to utilize a sequential type Fuzzy backward reasoning device as the Fuzzy backward reasoning device 5 in which reasoning is effected each time one feature quantity is obtained and candidates are gradually narrowed down. Feature quantities by (j=1,2,3) normalized sequentially one by one are inputted through the selector 105 which is to extract an activated feature quantity, and reasoned values $\hat{a}_i$ (i=1,2,3) of the possibilities of respective targets are computed and outputted. FIG. 9 illustrates a flow chart indicative of the operation of the sequential type Fuzzy backward reasoning device.

In steps 8, 9, associated algorithm is initialized. l is a count showing a feature quantity at which number is inputted, and $\hat{a}^{ka}$ (l) is a probable reasoned value of the kind of a target yielded by the sequential type Fuzzy backward reasoning, say, a reasoned value of the foregoing possibility $(a_1, a_2, a_3)$. Those probable reasoned values are quite unknown initially and hence range from 0 to 1.

$$\hat{a}^{ka}(0) = \phi = ((0-1) \ldots ,(0-1)) \quad (35)$$

Herein, $K_a - \max(0)$ is the number of memories for $\hat{a}$ (l) previously prepared.

In step 10, l is updated by 1.

In step 11, an l-th feature quantity b (l) is inputted from the feature quantity extractor 104. For example, $b_1$ is inputted in the example of the equation (31).

In step 12, a relevant vector r (l) corresponding to the l-th feature quantity b (l) is inputted. r (1)=(0.0 0.5 1.0)$^T$ here corresponds to $b_1$ of the equation (31), where T indicates transposition.

In step 13, $\mathbf{u}$ (l)=($u_i$ (l)) is computed as follows.

$$u_i(l) = r_i(l)\omega b(l) \quad (36)$$

Herein, $\mathbf{u}_i$(l) and $r_i$(l) denote i-th elements of the vectors $\mathbf{u}_i$ (l) and r (l), respectively. The following relation holds when $b_1$ of the equation (31) satisfies $b_1 = 0.5$, for example.

$$\mathbf{u}(1) = \begin{bmatrix} 0.0 \; \omega \; 0.5 \\ 0.5 \; \omega \; 0.5 \\ 1.0 \; \omega \; 0.5 \end{bmatrix} = \begin{bmatrix} \phi \\ [0.5 - 1.0] \\ 0.5 \end{bmatrix} \quad (37)$$

In step 14, the operation branches off depending upon whether $b(l) = 0$ or not.

In step 15, a case b (l)$\neq$0 is processed, i.e., the operation again branches off depending upon whether or not all computed elements $\mathbf{u}$(l) are $\phi$.

In step 16, the operation is with the former case and outputs "no solution".

In step 17, the operation is with the latter case and $\tilde{\mathbf{u}}$ (l) = [$\tilde{u}_i$ (l)] is computed as follows.

$$\tilde{\mathbf{u}}_i(l) = r_i(l)\tilde{\omega} b(l) \quad (38)$$

The following expression holds when $b_1$ in the equation (31) satisfies $b_1 = 0.5$.

$$\tilde{\mathbf{u}}(l) = \begin{bmatrix} 0.0 \; \tilde{\omega} \; 0.5 \\ 0.5 \; \tilde{\omega} \; 0.5 \\ 1.0 \; \tilde{\omega} \; 0.5 \end{bmatrix} = \begin{bmatrix} [0.0 - 1.0] \\ [0.0 - 1.0] \\ [0.0 - 0.5] \end{bmatrix} \quad (39)$$

In step 18, $W^{kw}$ (l) is computed. $W^{kw}$ (l) possesses the same dimension as those of $\mathbf{u}$(l) and $\tilde{\mathbf{u}}$(l), and selects its one element from non-$\phi$ elements of $\mathbf{u}$ (l) and its remaining elements from $\tilde{\mathbf{u}}$(l). Such $W^{kw}$ (l) is existent by kw-max(l), and kw (l) on the right shoulder of $W$(l) indicates that $W^{kw}$(l) is kw-th $W$ (l). If $b_1 = 0.5$ for example, then kw-max(1)=2, and hence $W$ (1) has the following two components.

$$W^1(1) = \begin{bmatrix} [0.0 - 1.0] \\ [0.0 - 1.0] \\ [0.0 - 0.5] \end{bmatrix}, W^2(1) = \begin{bmatrix} [0.0 - 1.0] \\ [0.0 - 1.0] \\ 0.5 \end{bmatrix} \quad (40)$$

In step 19, the operation is with a case where b=0 holds in step 14, and there is existent only one $W^{kw}$(l) as follows.

$$W^1(l) = \tilde{\mathbf{u}}(l) \quad (41)$$

In step 20, the operation takes intersection between an (l−1)-th reasoned result $\hat{a}^{ka}$ (l−1) and information $W^{kw}$ (l) of a solution obtained this time:

$$C_i^k(l) = a_i^{KaT}(l-1) \cap W_i^{KW}(l) \quad (42)$$

Herein, Ka and Kw are existent by $$K_a = 1, 2, \ldots, K_a - \max(l-1)$$

$$K_w = 1, 2, \ldots, K_w - \max(l),$$

and hence $C_i^k$ (l) is eventually existent by $$K = 1, 2, \ldots, K_a - \max(l-1), K_w - \max(l).$$

There is however rejected K-th $C^k$ (l) where there is existent any i that satisfies $C_i^k$ (l)=$\phi$ in the equation (42).

In the present example, $C_i^k$ (l) is given as follows:

$$C^1(1) = \begin{bmatrix} [0.0 - 1.0] \\ [0.0 - 1.0] \\ [0.0 - 1.0] \end{bmatrix} \cap \begin{bmatrix} [0.0 - 1.0] \\ [0.0 - 1.0] \\ [0.0 - 0.5] \end{bmatrix} \quad (43)$$

$$= \begin{bmatrix} [0.0 - 1.0] \\ [0.5 - 1.0] \\ [0.0 - 0.5] \end{bmatrix}$$

$$C^2(1) = \begin{bmatrix} [0.0 - 1.0] \\ [0.0 - 1.0] \\ [0.0 - 1.0] \end{bmatrix} \cap \begin{bmatrix} [0.0 - 1.0] \\ [0.0 - 1.0] \\ 0.5 \end{bmatrix} \quad (44)$$

$$= \begin{bmatrix} [0.0 - 1.0] \\ [0.0 - 1.0] \\ 0.5 \end{bmatrix}$$

In step 21, there is computed as a solution a transposed vector of $C^k$ (l); l=1,2, ..., $K_a$—max·$K_w$—max computed in the previous step and not rejected in the same step. $\hat{a}^{ka}$ (l); $K_a$=1,2, ..., $K_a$—max (l) is yielded putting close blanks produced by removal and applying numbers $K_a$ anew. In the present example, $$\hat{a}^1(1) = C^{1T}(1) = \begin{bmatrix} [0.0 - 1.0] \\ [0.5 - 1.0] \\ [0.0 - 0.5] \end{bmatrix}^T \quad (45)$$

$$\hat{a}^2(1) = C^{2T}(1) = \begin{bmatrix} [0.0 - 1.0] \\ [0.0 - 1.0] \\ 0.5 \end{bmatrix}^T \quad (46)$$

In step 22, it is judged whether $K_a$—max (l)=0 or not. If 0, then the operation skips to step 16.

In step 23, reasoned results $\hat{a}^{ka}$ (l) until present time, i.e., up to l-th one are outputted.

In step 24, it is judged whether the reasoning should be completed or not, and if not so, then the operation returns back to step 10.

In such a manner, a new reasoned value â (l) is yielded each time a new feature quantity is detected and evaluated. In the present example, $\hat{a}^{ka}(1)$ in the equations (45), (46) was yielded by the first reasoning. The interpretation is as follows. First, $\hat{a}_1{}^1(1)=(0.0-1.0)$ reveals that the possibility of the target to be a giant-sized passenger plane ranges from 0.0 to 1.0, i.e., that it can never be judged on the basis of the information obtained up to now that the target is a giant-sized passenger plane. Likewise, $\hat{a}_2{}^1(1)=(0.5-1.0)$ reveals the possibility of the target to be a fighter falls within 0.5-1.0. The Fuzzey backward reasoning thus demonstrates a feature that the reliability of a reasoned result is generally expressed with certain width. The width is generally narrowed progressively as the number l of execution times of the reasoning increases. This means a reasoned result is convergent.

An output from the sequential type Fuzzy backward reasoning device 5 operable as described above is an output from the target recognition device 6 according to the present invention and an input to the behavior deciding device 7. The behavior deciding device 7 with a reasoned result "no solution" judges that a target would be any one other than candidates of a supposed target, and gives a warning for an alert. Further, the behavior deciding device 7 judges, without a particular alert, when a reasoned result is $$(\hat{a}_1\hat{a}_2\hat{a}_3) = (1.0 \, 0.0 \, 0.0)$$

In the foregoing example, that a target would surely be a giant-sized passenger plane without any possibility of the target to be a fighter or a cruising missile. Further, if the reasoned result is given by $$(\hat{a}_1\hat{a}_2\hat{a}_3) = ((0.0-0.2) \, (0.0-0.3) \, 1.0),$$

for example, then the behavior deciding device 7 judges that the result clearly shows the feature of a cruising missile although the features of a giant-sized passenger plane and a fighter can also be found, and issues an instruction that an emergency measure should be taken against the cruising missile.

Although in the above embodiment only a radar was incorporated as the sensor 102, such a single sensor may be useable as a special case in use of a plurality of sensors. However, use of a plurality of sensors is rather standardized if a certain sensor in use is troubled and hence another sensor is instead utilized for obtaining information.

Additionally, although in the above embodiment a sequential type Fuzzy backward reasoning device was employed as the Fuzzy backward reasoning device 5, non-sequential type algorithm may also be utilized if no on-line construction is required. In that case, the selector 105 is unnecessary.

Furthermore, although in the above embodiment the tracking filter 103 was incorporated additionally, the target recognition device of the present invention can effectually be constructed without use of such a filter.

What is claimed is:

1. A target recognition device comprising a sensor for observing a target and for obtaining information concerning the target, a plurality of feature quantity extractors for receiving the information concerning the target outputted from said sensor and for extracting a feature quantity of the target, and a Fuzzy backward reasoning device for receiving the information of the feature quantity outputted from each feature quantity extractor and for reasoning the kind of the target by Fuzzy backward reasoning based upon a Fuzzy theory from kinds of targets known as candidates and knowledge information concerning those targets.

2. A target recognition device according to claim 1 characterized in that it includes a sequential type Fuzzy backward reasoning device as said Fuzzy backward reasoning device, and a selector for receiving outputs from the plurality of feature quantity extractors and for extracting an activated feature quantity among said outputs for an input to said sequential type Fuzzy backward reasoning device.

3. A target recognition device according to claim 1 or 2 characterized in that it includes a radar as the sensor, and a tracking filter for receiving an output from said radar and for estimating and outputting the accurate position and speed of the target.

4. A method of performing Fuzzy backward reasoning comprising the steps of:

one or more sensors sensing a sequence of observed feature quantities representative of a cause;

said one or more sensors supplying said sequence of observed feature quantities to a computer;

performing a sequence of Fuzzy backward reasoning steps in the computer during sequential reasoning periods in response to said sequence of observed feature quantities, each Fuzzy backward reasoning step being based on a feature quantity of said sequence of observed feature quantities, a causality relation between said feature quantity and causes of said feature quantity, and a previous reasoned result from a previous Fuzzy backward reasoning step, said causality relation being stored in said computer, each Fuzzy backward reasoning step outputting a reasoned result indicating a cause of the feature quantity;

combining a predetermined number of sets of reasoned results among said reasoned results outputted sequentially to form a union as one reasoned result; and supplying the union to the next Fuzzy backward reasoning step as a previous reasoned result.

5. A method of performing Fuzzy backward reasoning comprising the steps of:

one or more sensors sensing a sequence of observed feature quantities representative of a cause;

said one or more sensors supplying said sequence of observed feature quantities to a computer;

performing a sequence of Fuzzy backward reasoning steps in the computer during sequential reasoning periods in response to said sequence of observed feature quantities, each Fuzzy backward reasoning step being based on a feature quantity of said sequence of observed feature quantities, a causality relation between said feature quantity and causes of said feature quantity, and a previous reasoned result from a previous Fuzzy backward reasoning step, said causality relation being stored in said computer, said feature quantity and said causality relation being received as interval Fuzzy quantities for said Fuzzy backward reasoning step, each Fuzzy backward reasoning step outputting a reasoned result indicating a cause of the feature quantity; and supplying the reasoned result of each Fuzzy backward reasoning step to the next Fuzzy backward reasoning step as a previous reasoned result.

* * * * *